United States Patent
Harel et al.

(10) Patent No.: US 8,032,092 B2
(45) Date of Patent: Oct. 4, 2011

(54) SYSTEM, APPARATUS AND METHOD FOR INTRODUCING ANTENNA PATTERN VARIABILITY

(75) Inventors: Haim Harel, New York, NY (US); Kenneth Kludt, Bedminster, NJ (US); Amos Baron, Ramla (IL)

(73) Assignee: Magnolia Broadband Inc., Warren, NJ (US)

( * ) Notice: Subject to any disclaimer, the term of this patent is extended or adjusted under 35 U.S.C. 154(b) by 479 days.

(21) Appl. No.: 12/330,133

(22) Filed: Dec. 8, 2008

(65) Prior Publication Data
US 2009/0149139 A1 Jun. 11, 2009

Related U.S. Application Data

(60) Provisional application No. 60/996,811, filed on Dec. 6, 2007.

(51) Int. Cl.
*H04B 7/02* (2006.01)
(52) U.S. Cl. .................................................. 455/101
(58) Field of Classification Search .................. 375/299; 455/69, 101, 522
See application file for complete search history.

(56) References Cited

U.S. PATENT DOCUMENTS

| | | | |
|---|---|---|---|
| 5,642,353 | A | 6/1997 | Roy, III et al. |
| 5,832,044 | A | 11/1998 | Sousa et al. |
| 5,991,330 | A | 11/1999 | Dahlman et al. |
| 5,999,826 | A | 12/1999 | Whinnett |
| 6,185,440 | B1 | 2/2001 | Barratt et al. |
| 6,226,509 | B1 | 5/2001 | Mole et al. |
| 6,236,363 | B1 | 5/2001 | Robbins et al. |
| 6,330,294 | B1 | 12/2001 | Ansbro et al. |
| 6,343,218 | B1 | 1/2002 | Kaneda et al. |
| 6,392,988 | B1 | 5/2002 | Allpress et al. |
| 6,492,942 | B1 | 12/2002 | Kezys |
| 6,636,495 | B1 | 10/2003 | Tangemann |

(Continued)

FOREIGN PATENT DOCUMENTS

EP 0 986 193 3/2000
(Continued)

OTHER PUBLICATIONS

Derryberry et al., "Transmit Diversity in 3G CDMA Systems", Wideband Wireless Access Technologies to Broadband Internet, IEEE Communications Magazine, Apr. 2002, pp. 68-75.

(Continued)

*Primary Examiner* — Jeffrey Zweizig
(74) *Attorney, Agent, or Firm* — Pearl Cohen Zedek Latzer, LLP (57) ABSTRACT

A device, system, and method for providing a transmit diversity device have a first antenna and a second antenna. The first antenna may have a first power transmission gain pattern, which may be non-uniform in a reference plane. The second antenna may have a second power transmission gain pattern, which may be non-uniform in a reference plane. The first and second antennae may be arranged with respect to each other such that a minimum power region of the first gain pattern overlaps a maximum power region of the second gain pattern in the reference plane. The transmit diversity device may also have a processor to receive a feedback parameter from a feedback device. The processor may produce a different transmit diversity parameter based on the feedback parameter for each of a first and second signals to be transmitted on the first and second antennae, respectively.

12 Claims, 8 Drawing Sheets

U.S. PATENT DOCUMENTS

| | | | |
|---|---|---|---|
| 6,704,370 B1 | 3/2004 | Chheda et al. | |
| 6,745,009 B2 | 6/2004 | Raghothaman | |
| 6,810,264 B1 | 10/2004 | Park et al. | |
| 6,859,643 B1 | 2/2005 | Ma et al. | |
| 6,882,228 B2 | 4/2005 | Rofougaran | |
| 7,181,246 B2 * | 2/2007 | Lo | 455/562.1 |
| 7,505,741 B2 * | 3/2009 | Li et al. | 455/101 |
| 7,941,104 B2 * | 5/2011 | Lim et al. | 455/101 |
| 2003/0112880 A1 | 6/2003 | Walton et al. | |
| 2004/0048584 A1 | 3/2004 | Vaidyanathan et al. | |
| 2004/0085239 A1 | 5/2004 | Ukena et al. | |
| 2005/0059355 A1 | 3/2005 | Liu | |
| 2005/0143113 A1 | 6/2005 | Lee et al. | |
| 2008/0227404 A1 | 9/2008 | Harel et al. | |

FOREIGN PATENT DOCUMENTS

| | | |
|---|---|---|
| EP | 1 282 242 | 2/2003 |
| EP | 1 282 244 | 2/2003 |
| EP | 1 284 545 | 2/2003 |
| EP | 1 262 031 | 5/2004 |
| GB | 2 353 437 | 2/2001 |
| JP | 09-238098 | 9/1997 |
| JP | 2000-151484 | 5/2000 |
| WO | WO 97/24818 | 7/1997 |
| WO | WO 00/79701 | 12/2000 |
| WO | WO 01/69814 | 9/2001 |
| WO | WO 03/090386 | 10/2003 |
| WO | WO 2004/045108 | 5/2004 |
| WO | WO 2005/081444 | 9/2005 |

OTHER PUBLICATIONS

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

* cited by examiner

SYSTEM, APPARATUS AND METHOD FOR INTRODUCING ANTENNA PATTERN VARIABILITY

CROSS REFERENCE TO RELATED APPLICATIONS

This application claims the benefit of U.S. Provisional Patent Application No. 60/996,811, filed on Dec. 6, 2007, which is incorporated in its entirety herein by reference.

BACKGROUND OF THE INVENTION

1. Field of the Invention

This invention relates generally to the field of wireless communications and more specifically to transmit diversity devices.

2. Description of the Related Art

Transmitting devices using a plurality of antennae to transmit a signal simultaneously using a diversity parameter may reduce the total transmission power required for a signal to reach a receiving communication device when compared to using one antenna only. Multiple antenna elements in the transmitting device may enhance spectral efficiency and capacity, while reducing signal degradation caused by multipath and fading. One or more transmit diversity parameter may be applied to signals transmitted from two or more antennae, and may modify an effective power distribution detected by receiving communication devices, such as base stations. The transmitted signals may propagate along different paths and may reach the receiving communication device with different phases that may interfere. The total power of the interfering signals perceived by base stations may change with varying parameters of transmit diversity control. It is a goal of mobile transmit diversity devices to minimize destructive interference of signals at the base station in order to increase the total power of the received signals.

US Patent Publication No. 2008/0227404, entitled "Method, Apparatus, and System for Providing Feedback to Transmit Diversity Device", published Sep. 18, 2008 and assigned to the assignee of the present application, the contents of which are incorporated herein by reference, describes optimizing transmit diversity parameters to reduce destructive interference of signals from different antennae received at the base station. One such method includes matching the wavepatterns of the signals from different antennae so that the signals coincide and constructively interfere.

However, with this solution, a new problem is encountered. In a wireless connection, for a base station to receive transmitted signals, the base station may require that the signals reach the base station with a power greater than a predetermined threshold. Diversity gain is a measure of the reduction in the total transmission power of the transmit diversity device by using two or more antennae compared using one antenna in order to meet the required predetermined threshold of power at the base station. When the wavepatterns of signals from different antennae coincide, a maximum power region of a signal from one antenna may be added to a corresponding maximum power region of a signal from another antenna. The result is a large diversity gain at maximum power regions of the waveform of the signals. However, a receiving base station may be located outside of a maximum power region, in minimum power regions of the waveform of the signals.

There is a need for a system, device, and method, to improve the diversity gain of transmit diversity devices.

SUMMARY OF EMBODIMENTS OF THE INVENTION

According to embodiments of the present invention, a transmit diversity device may have a first antenna and a second antenna. The first antenna may have a first power transmission gain pattern, which may be non-uniform in a reference plane. The second antenna may have a second power transmission gain pattern, which may be non-uniform in the reference plane. The first and second antennae may be arranged with respect to each other such that a minimum power region of the first gain pattern overlaps a maximum power region of the second gain pattern in the reference plane. The transmit diversity device may also have a processor to receive a feedback parameter from a receiving communication device, also referred to as a feedback device. The processor may produce a transmit diversity parameter based on the feedback parameter for first and second signals to be transmitted on the first and second antennae, respectively.

According to embodiments of the present invention, a method is provided for setting commands in a beam-former of a mobile device. The method may include selecting, from a mobile device, a first set of at least two signals radiated from non-spherical antennas having a first orientation with respect to each other and a second set of signals radiated from the same antennas as above but having a second orientation with respect to each other. The second orientation may be different from the first orientation. A process may determine which of the first and the second sets of signals is received at the feedback device with a greater total power. A command may be set, in the mobile device, to simultaneously transmit at least two non-spherical signals that have the orientation of the set of signals received with the greater total power.

BRIEF DESCRIPTION OF THE DRAWINGS

Embodiments of the invention will be understood and appreciated more fully from the following detailed description in conjunction with the figures, which are not to scale, in which like reference numerals indicate corresponding, analogous or similar elements, and in which.

DETAILED DESCRIPTION OF EMBODIMENTS OF THE INVENTION

Embodiments of the present invention and its advantages are best understood by referring to FIGS. 1-4C of the drawings, like numerals being used for like and corresponding parts of the various drawings.

Figure 1:
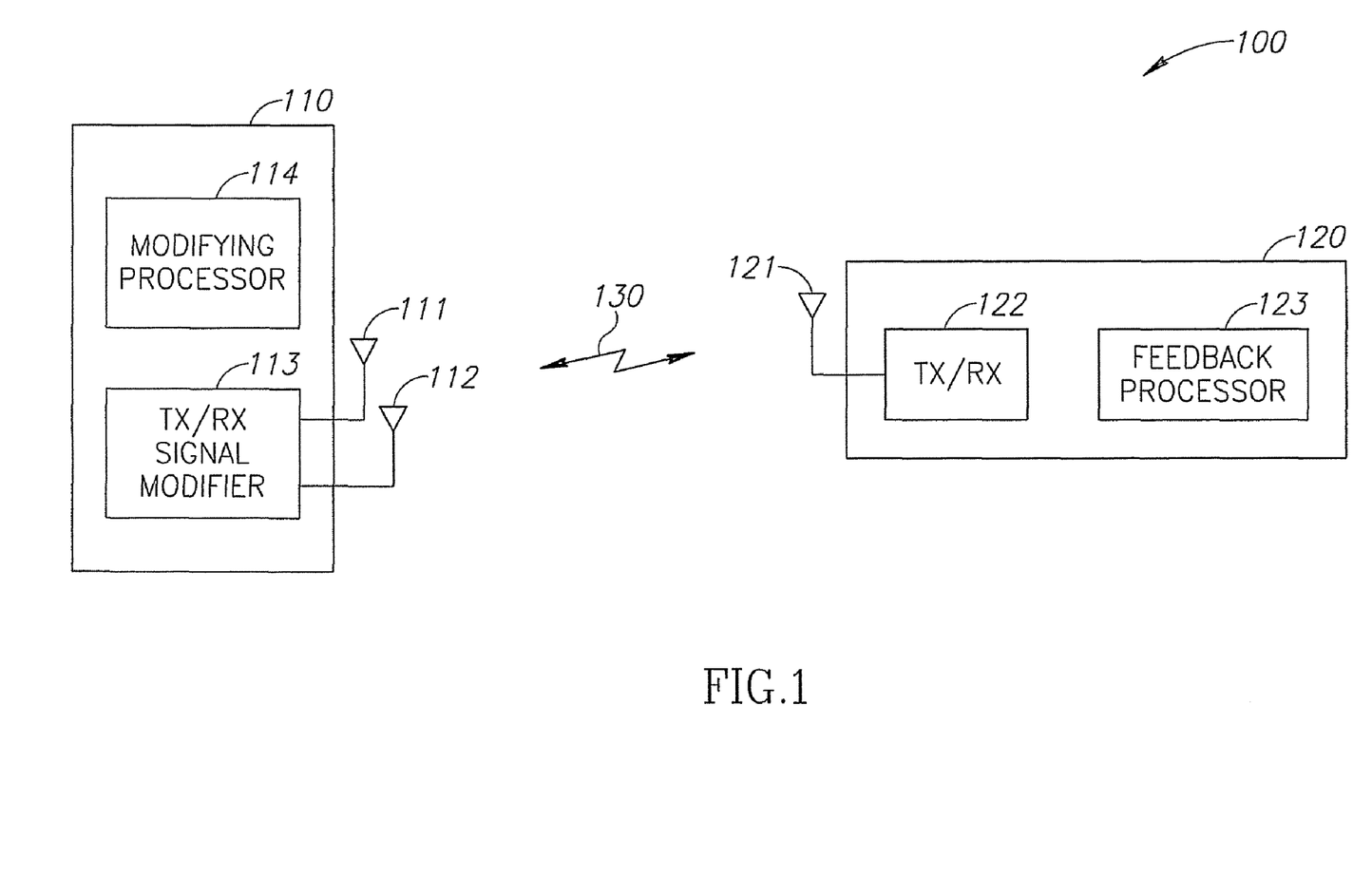
FIG. 1 is a block diagram of a wireless communication network including a transmit diversity device having two antennae for transmitting a signal concurrently using two antennae according to an embodiment of the invention.

FIG. 1 is a block diagram of a wireless communication network 100 including a transmitter 110 having two antennae 111 and 112 for transmitting signals concurrently over the same frequency according to an embodiment of the invention, wherein the signals include the same information, but typically differ by a transmit diversity parameter. It may be appreciated by persons skilled in the art that transmit diversity device 110 may have three or more antennae (not shown).

According to the illustrated embodiment, network 100 operates to provide services such as communication sessions. A communication session may refer to an active communication between endpoints, measured from endpoint to endpoint. Information is communicated during a communication session. Information may refer to voice, data, text, audio, video, multimedia, control, signaling, other information, or any combination of the preceding.

The information may be communicated in packets. A packet may comprise a bundle of data organized in a specific way for transmission, and a frame may comprise the payload of one or more packets organized in a specific way for transmission. A packet-based communication protocol such as Internet Protocol (IP) may be used to communicate the packets.

Network 100 may utilize communication protocols and technologies to provide the communication sessions. Examples of communication protocols and technologies include those set by the Institute of Electrical and Electronics Engineers, Inc. (IEEE) 802.xx standards, International Telecommunications Union (ITU-T) standards, European Telecommunications Standards Institute (ETSI) standards, Internet Engineering Task Force (IETF) standards, or other standards.

Devices of network 100 may use any suitable multiple access technology, for example, a code division multiple access (CDMA) technology. According to one embodiment, network 100 may operate according to a CDMA 2000 telecommunications technology that uses a single CDMA channel. As an example, a CDMA 2000 high rate data packet technology, such as the Evolution Data Only (EVDO) technology may be used.

Network 100 may comprise any suitable communication network. A communication network may comprise all or a portion of a public switched telephone network (PSTN), a public or private data network, a local area network (LAN), a metropolitan area network (MAN), a wide area network (WAN), a global computer network such as the Internet, a wireless network, a local, regional, or global communication network, an enterprise intranet, other suitable communication link, or any combination of the preceding.

A component of network 100 may include logic, an interface, memory, other component, or any suitable combination of the preceding. "Logic" may refer to hardware, analog and/or digital electrical circuitry, software, other logic, or any suitable combination of the preceding. Certain logic may manage the operation of a device, and may comprise, for example, a processor. "Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise a Random Access Memory (RAM), a Read Only Memory (ROM), a magnetic drive, a disk drive, a Compact Disk (CD) drive, a Digital Video Disk (DVD) drive, a removable media storage, any other suitable data storage medium, or a combination of any of the preceding.

Network 100 may include one or more transmit diversity devices 110 and one or more feedback devices 120 that communicate via a wireless link 130. Either or both of devices 110 and 120 may be any device operable to communicate information via signals with one or more other communication devices. In a preferred embodiment of the invention, transmit diversity devices 110 may be a mobile subscriber unit, and feedback device 120 may be a base station.

A mobile subscriber unit may comprise any device operable to communicate with a base station, for example, a personal digital assistant, a cellular telephone, a mobile handset, a computer, or any other device suitable for communicating signals to and from a base station. A mobile subscriber unit may support, for example, Session Initiation Protocol (SIP), Internet Protocol (IP), or any other suitable communication protocol.

A base station may provide a subscriber unit access to a communication network that allows the subscriber unit to communicate with other networks or devices. A base station typically includes a base transceiver station and a base station controller. The base transceiver station communicates signals to and from one or more mobile subscriber units. The base station controller manages the operation of the base transceiver station.

In a preferred embodiment of the invention, transmit diversity device 110 has two or more antennae 111 and 112 and feedback device 120 has one antenna 121. However, it may be appreciated by persons skilled in the art that feedback device 120 may have one or more antenna elements (not shown).

An arrangement of multiple antennae 111 and 112 may provide for a separation process known as spatial filtering, which may enhance spectral efficiency, allowing for more transmitters to simultaneously operate over a given frequency band.

Antennae 111, 112, and/or 121, are each operable to receive, transmit, or both receive and transmit a signal. Antennae 111, 112, and/or 121 may be radio frequency (RF) antennae. Antennae 111, 112, and/or 121 may each include, for example, whip, chip, slot, Planar Inverted 'F' Antenna (PIFA), or any other suitable non-directional antenna arrangement. Other known antennae or arrangements thereof may be used in accordance with various embodiments of the present invention.

A communication link between transmit diversity device 110 and feedback device 120 such as wireless link 130 may be a RF link that is cellular in network organization. Wireless link 130 may be used to communicate a signal between transmit diversity device 110 and feedback device 120.

Transmit diversity device 110 may include a processor 114 and a transmit/receive signal modifier 113 that may receive an input signal for transmission and calculate and produce two or more signals, differing by a transmit diversity parameter, for transmission over the respective two or more antennae 111 and 112. The transmit diversity parameter may be based on the feedback received from the feedback device.

Feedback device 120 may include a processor 123 and transmit/receive module 122 that may generate and transmit a feedback signal indicating the quality of the signal transmitted by the transmit diversity device, as received at the feedback device 120. Transmit diversity device 110 may then modify a feature of the transmit signal, for example, the transmit diversity parameter, in accordance with feedback information corresponding to the feedback signal.

According to one embodiment of the invention, modifying a signal may refer to modifying a signal feature. A transmission signal feature, or in some embodiments of the invention, a transmit diversity parameter, may refer without limitation to any feature of the transmission, for example, relative phase, relative amplitude, relative power, absolute power, frequency, timing, other suitable signal feature that may be modulated, or any combination of the preceding. Relative phase may refer to the phase difference between the phase of a first signal of a first antenna 111 and the phase of a second signal of a second antenna 112. Relative power may refer to the ratio between the power of a first signal of a first antenna 111 and the power of a second signal of a second antenna 112, which ratio may be defined on a linear or logarithmic scale. Relative amplitude may refer to the ratio between the amplitude of a first signal of first antenna 111 and the amplitude of a second signal of second antenna 112. Absolute power may refer to the total power transmitted by all antennae of transmit diversity device 110.

First and second antennae 111 and 112 each have a power transmission gain pattern, which in embodiments of the invention may indicate high gain and directionality of the antenna. The power transmission gain of an antenna may be defined, e.g., as the ratio of the intensity of the radiation of an antenna in a given direction (at an arbitrary distance) to the intensity radiated at the same distance by a hypothetical omnidirectional antenna that radiates equally in all directions (e.g., and may be ideal or has no losses). First and second antennae 111 and 112 are preferably directional antennae. Therefore, first and second antennae 111 and 112 have positive power transmission gains in certain directions, and negative power transmission gains in other directions. Each antenna may have a first direction in which the power transmission gain is a maximum, and a second direction in which the power transmission gain is a minimum.

It may be noted that the average power gain of a non-directional antenna in all directions is unity, or zero decibels because the gain is compared to an omnidirectional antenna of equivalent power rating. Thus, if an antenna has a positive gain in some directions, it must have counterbalancing negative gain in other directions.

However, a system of multiple non-directional antennae transmitting signals using diversity transmission may together produce a considerable diversity gain. Diversity gain may refer without limitation to a measure of the decrease in total transmission power needed to meet a performance standard (e.g., signal strength, signal to noise ratio, etc.) at a receiving device, when transmitting using multiple antennae as compared to total transmission power needed to meet the same performance standard using a single omnidirectional antenna.

It is a goal in the field of diversity transmission to increase the diversity gain of the signal transmission using antennae 111 and 112 to decrease the power consumption of transmissions from transmit diversity device 110 to feedback device 120 for all orientations of feedback device 120. A transmit diversity device having antennae oriented as described herein permit may therefore at least partially achieve this goal by requiring less power to satisfy the base station communication requirements than a conventional device, e.g., a transmitter having one or a plurality of omnidirectional antenna. Moreover, the overall performance taking into account all orientations may also be better for a device according to the embodiments of the invention than a transmitter having multiple antennae in which all antennae is oriented in the same direction.

Figure 2A:
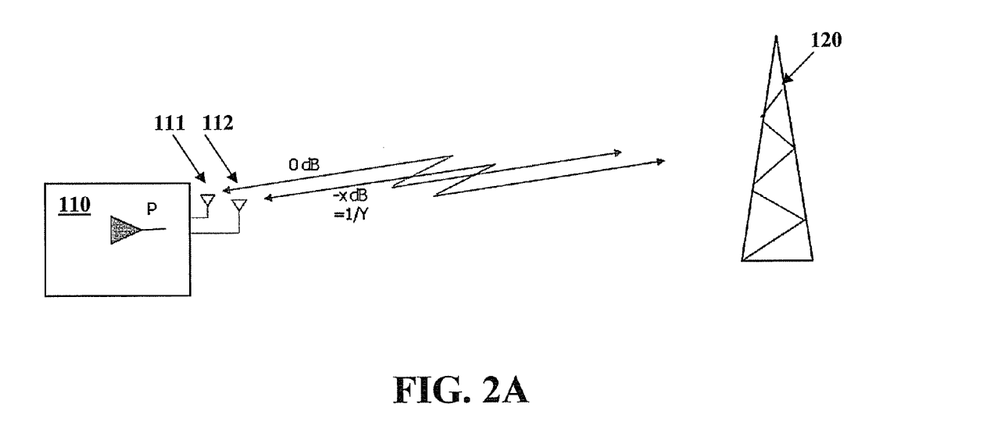
FIGS. 2A and 2B are schematic illustrations of a transmit diversity device, in which a single and multiple antennae are operated, respectively, the difference in operation used to determine the diversity gain of the antennae according to an embodiment of the invention.
Figure 2B:
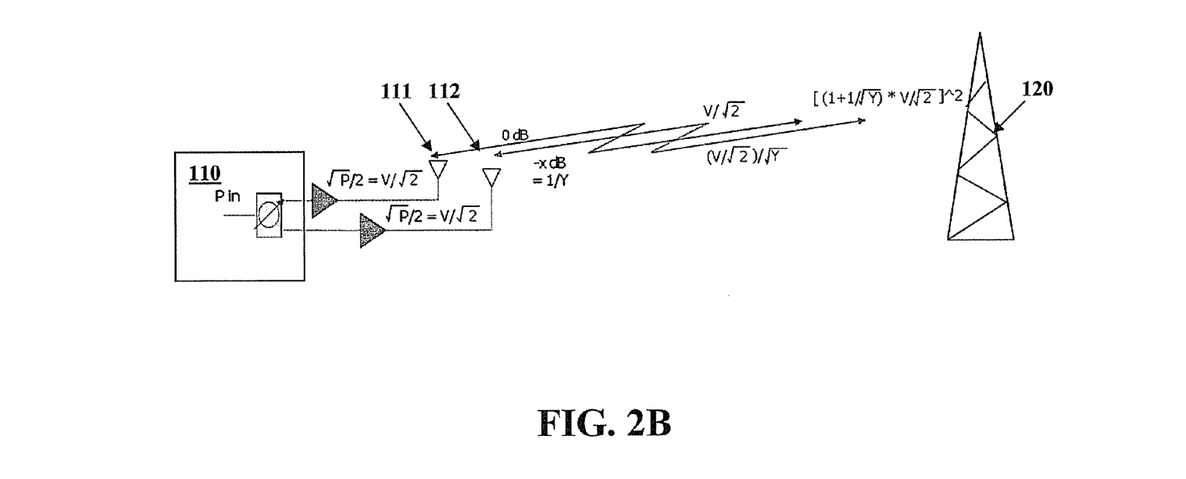

The diversity gain of first and second antennae 111 and 112 may be calculated in substantially all given directions, for example, using embodiments described in reference to FIGS. 2A and 2B.

FIGS. 2A and 2B are schematic illustrations of a transmit diversity device 110. In FIG. 2A, transmit diversity device 110 transmits individual signals using each antenna separately. In FIG. 2B, transmit diversity device 110 transmits the signals concurrently over the two antennae. The difference in the power at a receiving feedback device 120 of the individually transmitted signal (in FIG. 2A) and the two concurrently transmitted signals (in FIG. 2B) may be used to determine the diversity gain of the system of antennae in a given direction, according to an embodiment of the invention.

FIG. 2A includes a diversity transmitting device 110 to transmit a signal to feedback device 120 using antennae 111 or 112. Antennae 111 and 112 are preferably directional. In a given direction, e.g., the direction to the receiving feedback device 120, antennae 111 and 112 may have an arbitrary non-zero gain difference of x dB with respect to each other. Transmissions from antennae 111 and 112 are evaluated separately by the feedback device. Antennae 111 and 112 may have a resulting gain imbalance, Y, which may be the gain difference x dB expressed in a linear scale. The gain imbalance, Y, may be defined, e.g., as $Y=10^{(x/10)}$.

In order to measure the diversity gain, each of antennae 111 and 112 may individually transmit a signal to feedback device 120. Since the location of the receiving feedback device 120 relative to the transmitting transmit diversity device 110 is not known, the individual gains of antennae 111 and 112 in the direction of feedback device 120 are likewise not known. However, since antennae 111 and 112 have a relative gain difference of x dB, it is known that one of antennae 111 and 112 requires less transmission power to transmit signals to feedback device 120 that meet a performance standard. The performance standard may be a requirement set by feedback device 120 for communicating, e.g., such as a minimum allowable signal strength, signal to noise ratio, etc. P may be used to denote the transmission power of the one of antennae 111 and 112 that requires the least transmission power to meet the performance standard at feedback device 120. YP may be used to denote the transmission power of the other one of antennae 111 and 112, which requires the most transmission power to meet the same performance standard. Since it is essentially arbitrary which of antennae 111 and 112 requires less transmission power to meet this standard, an equal probability may be assumed that each of antennae 111 and 112 is the antenna that requires less power. Therefore, the average transmission power required of a single one of antennae 111 and 112 is the average of the transmission powers required for both of antennae 111 and 112. The average transmission power of a single one of antennae 111 and 112 may be, e.g., $(1+Y)(P)/2$.

FIG. 2B includes a transmit diversity device 110 to transmit two signals concurrently to feedback device 120, in which each signal is transmitted from one of antennae 111 and 112. As in FIG. 2A, antennae 111 and 112 of FIG. 2B may have an arbitrary non-zero gain difference of x dB, e.g., expressed in a linear scale as the imbalance, $Y=10^{(x/10)}$.

To observe the effect of transmitting using two antennae concurrently as compared with one antenna alone, the embodiment described in FIG. 2B may use the same transmission power, P, that is required by each single antenna in FIG. 2A to meet the performance standard of the feedback device 120. The total transmission power, P, may be distributed equally or unequally between the two antennae 111 and 112. In the event of even distribution of power between the antennae, transmit/receive signal modifier 113 of transmit diversity device 110 may provide a voltage, e.g., $V/(\sqrt{2})$, across each of antennae 111 and 112 to respectively generate two signals, each signal having the power, e.g., P/2. These powers give a signal voltage=$\sqrt{(P/2)}=V/(\sqrt{2})$, where V is the voltage produced by full power P. Since antennae 111 and 112 have a gain imbalance of Y, when an equal voltage is applied across each antenna 111 and 112 (e.g., $V/(\sqrt{2})$), one of antennae 111 and 112 has a greater power yield than the other at feedback device 120. The antenna with a greater power yield may have a power yield of, e.g., $\sqrt{P/(2)}$, which may correspond to an effective voltage of, e.g., $V/(\sqrt{2})$, across the antenna. The antenna with a lower power yield may have a power yield of, e.g., $\sqrt{P/(2Y)}$, which may correspond to an effective voltage of, e.g., $V/(\sqrt{2Y})$, across the antenna.

Since it may be arbitrary which one of antennae 111 and 112 has a greater power yield, each of antennae 111 and 112 may be assumed to have an equal probability to have the greater power yield. Therefore, the effective voltage across both of antennae 111 and 112 is the sum of the greater and lower effective voltages. The sum of the voltages is, e.g., $[(1+1/\sqrt{Y})*(V)/(\sqrt{2})]$. The total power yield of the two antennae may be the square of the sum of the effective voltage, e.g., $[(1+1/\sqrt{Y})^2*(P)/(2)]$. In one embodiment, an effective radiated power (ERP) may reduce the average required transmission power to be the inverse of the total yield power, e.g., $1/[(1+1/\sqrt{Y})^2*(P)/(2)]$.

The diversity gain may be a measure of the ratio between the average required transmission power for each antenna to meet a performance standard at feedback device 120, using a single one of antennae 111 and 112, e.g., $(1+Y)(P)/2$, and using both antennae 111 and 112, e.g., $1/[(1+1/\sqrt{Y})^2*(P)/(2)]$. The diversity gain in this example may be $[(1+Y)*(1+1/\sqrt{Y})^2]/(4)$.

Figure 2C:
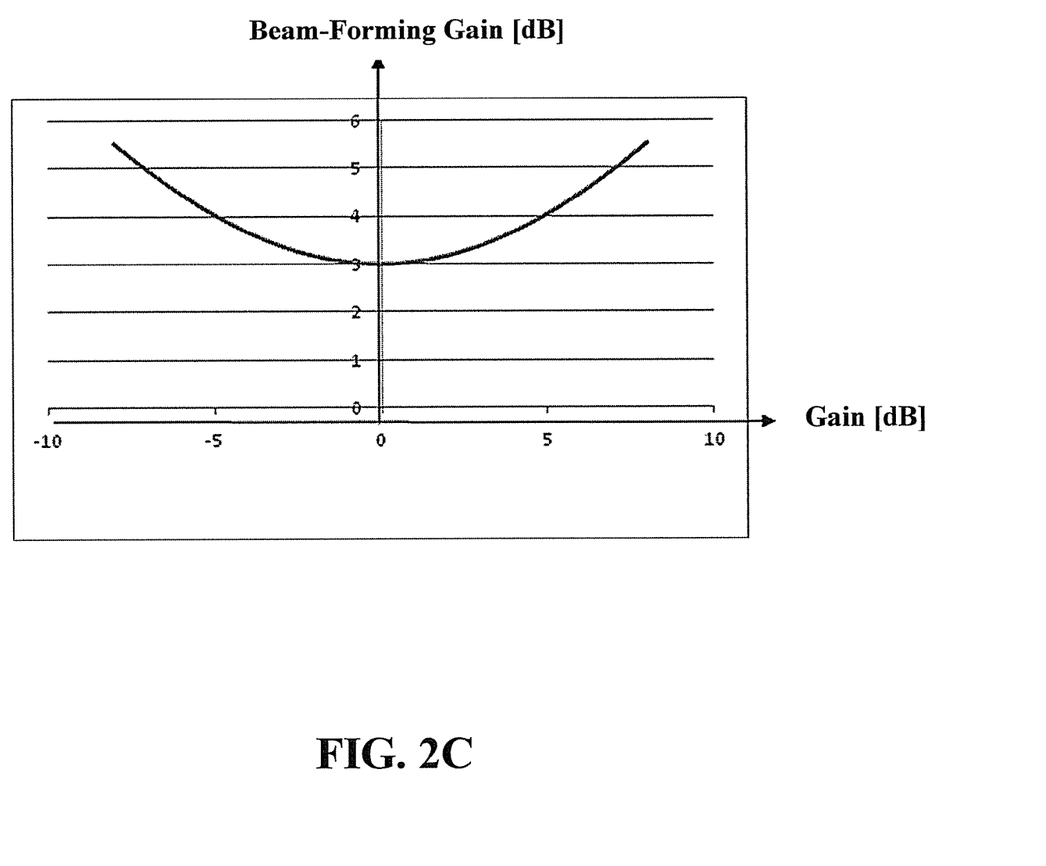
FIG. 2C is a chart of the diversity gain versus the gain imbalance of the transmit diversity device of FIG. 2B according to an embodiment of the invention.

FIG. 2C is a chart of the gain difference between antennae 111 and 112 of FIG. 2B, e.g., gain of antenna 111 less the gain of antenna 112, versus the diversity gain thereof in a given direction, according to an embodiment of the invention.

In one embodiment, the diversity gain is a parabolic function of the gain difference between antennae. The diversity gain function has a minimum value of diversity gain when the difference between the gain of the antennae is approximately zero, i.e., when the antennae have the same transmission power and are oriented in the same direction. In the example shown in FIG. 2C, when the gain difference is 0, the diversity gain is approximately 3 dB. Thus, when identical antenna are used, the diversity gain is 3 dB; however, according to embodiments of the invention, use of antennae having different transmission gain patterns may produce greater diversity gain, e.g., 4 dB, 5 dB, or 6 dB, or greater gains.

The diversity gain function increases (e.g., polynomially, exponentially, etc.) as the absolute value of the gain difference between antennae increases. It will be understood that the performance of the antennas of the diversity transmitter is measured based on power required to obtain a minimum threshold reception at the receiver. Accordingly, as transmission from the one antenna becomes weaker, for example, if the receiver is in the direction of a low area of the transmission gain pattern, it requires more power. Hence, the diversity gain is dominated by the high power needed by the weaker antenna of the two antennae. Therefore, the greater the gain imbalance between the antennae, the higher the diversity gain of the diversity transmitter.

FIGS. 2A-2C describe the behavior of antennae 111 and 112 transmissions in a single direction, i.e., the direction of a path from transmit diversity device 110 to feedback device 120. In any single direction, the greater the imbalance of the antennae 111 and 112, the greater the diversity gain. Therefore, by increasing the imbalance of antennae 111 and 112 in all directions, the diversity gain likewise increases in all directions.

FIGS. 3A, 3B, and 4A-4C describe the gains of antennae 111 and 112 in all directions in a reference plane.

Figure 3A:
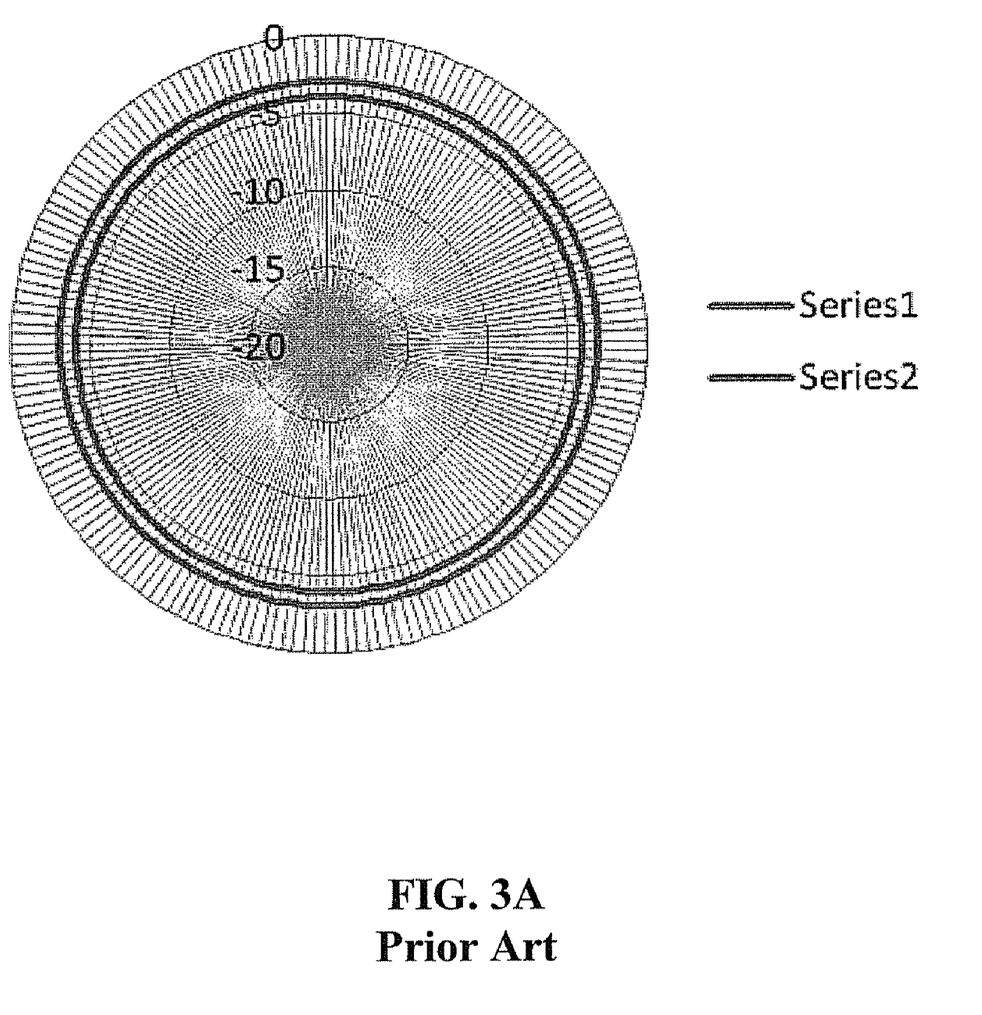
FIG. 3A is a diagram of a conventional power transmission gain patterns of two isotopic antennae of a transmit diversity device.

FIG. 3A is a diagram of a conventional power transmission gain patterns of two antennae of a transmit diversity device. Conventional transmit diversity devices having multiple antenna arrangements include omidirectional antennae (i.e., having nearly or approximate equal gain in all direction) or co-directional antennae (i.e., pointed in the same direction). These antennae have uniform power transmission gain patterns, e.g., the minimum gain equals the maximum gain, and therefore, they inherently coincide. For example, regions of maximum gain for both antennae coincide and regions of minimum gain for both antennae also coincide. The antennae operated simultaneously may produce a diversity gain of approximately 3 dB in all directions in a reference plane.

In the remaining figures, antennae 111 and 112 are non-uniform, and therefore, have a maximum gain in a first direction, and a minimum gain in a second direction, where the maximum gain is unequal to the minimum gain. Generally, each of antennae 111 and 112 have a non-uniform gain pattern (e.g., also referred to as radiation pattern or far-field pattern), which may be defined as the power transmission gain of the antenna taken in all directions. The gain pattern of an antenna may be measured, e.g., in a reference plane for a two-dimensional (2D) gain pattern or a reference sphere or cube for a three-dimensional (3D) gain pattern. Although generally 2D power transmission gain patterns are discussed herein, it will be appreciated by persons skilled in the art that, with minor modification, 3D power transmission gain patterns may be used in accordance with embodiments of the present invention.

According to an embodiment of the invention, shown, for example, in FIG. 3B and other figures, below, the diversity gain for all directions may be increased in substantially all regions, including regions of minimum gain for each antenna. In one embodiment of the invention, this increase in diversity gain may be accomplished by expanding the span of high or maximum gain pattern regions of a first antenna to cover low or minimum gain pattern regions of a second antenna. According to embodiments of the invention, multiple antennae may be arranged in a transmit diversity device (e.g., transmit diversity device 110 of FIG. 1) such that at least one region of maximum gain for one antenna (e.g., antenna 111 of FIG. 1) coincides with at least one region of minimum gain for another antenna (e.g., antenna 112 of FIG. 1). According to some embodiments of the invention, multiple antennae may be arranged in a transmit diversity device such that a plurality of regions of maximum gain for one antenna coincide with a respective plurality of regions of minimum gain for another antenna. Accordingly, each antenna may have different transmission gain patterns with non-overlapping maximum regions. In such a configuration, the maximum gain pattern of the combined system of multiple antennae are more spread-out and span a larger range, e.g., extending to regions of minimum gain value of one of the other antennae. Therefore, receiving devices (e.g., feedback device 120 of FIG. 1) located within the span of a minimum gain pattern region of one antenna may experience a maximum value increase in signal strength from the other antenna. The span of maximum gain in a reference plane is thereby increased to cover a greater geographical range, as compared with conventional systems.

In some embodiments of the invention, an orientation may refer to a direction in which an antenna is predominantly pointed and a relative orientation (e.g., of gain patterns and antennae) may refer to the difference in orientation (e.g., between two the gain patterns and antennae, respectively).

In some embodiments of the invention, a region of maximum gain of a gain pattern may refer without limitation to a region having an absolute maximum gain value of the gain pattern; a region having gain values greater than or equal to at least the smallest absolute maximum gain value of two or more gain patterns each from a different antenna; a neighborhood of an absolute maximum gain value in a gain pattern, where the neighborhood has a diameter of, for example, approximately 10% of the total coherent range of the gain pattern; a region which has a gain value greater than a predetermined threshold, for example, where the predetermined threshold for the gain value may correspond to a required power, signal to noise ration, or other standard, set by a receiving devices for a communication, where the predetermined threshold requires that at a given distance, the gain value of a signal in the direction of the region is greater than the gain values in all other directions or in 50% or 90% of other directions, or where the predetermined threshold requires that the gain values in the region exceeds e.g., approximately 50%, 75%, 90%, or 95%, of the gain values of other regions in the gain pattern, or where the predetermined threshold requires that the gain values in the region exceeds the gain values of other regions that occupy approximately 50%, 75%, 90%, or 95% of the total coherent range of a gain pattern in a reference plane. When two antennae are combined resulting in a combination of a first gain patterns from a first antenna and a second gain pattern from a second antenna, a region of maximum gain of the combined gain pattern may refer to a region where at least one of the first and second gain patterns contributes a region of maximum gain.

In some embodiments of the invention, a region of minimum gain of a gain pattern may refer to the negative of the aforementioned definitions of a region of maximum gain of a gain pattern. Alternatively, a region of minimum gain may refer to a region of a gain pattern that is not a region of maximum gain of the gain pattern. Other of different definitions of orientations or regions of maximum or minimum gain may be used.

Figure 3B:
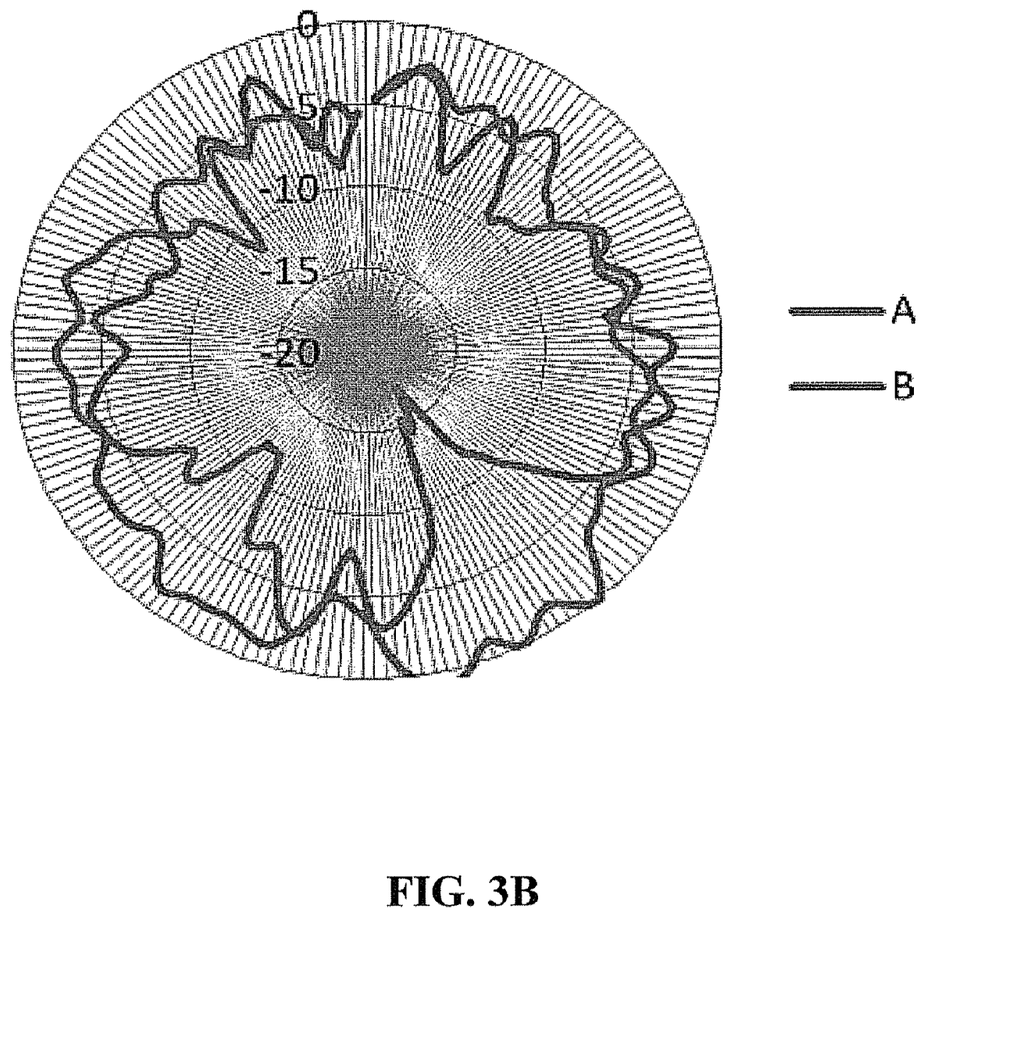
FIG. 3B is a diagram of non-uniform power transmission gain patterns of two antennae of a transmit diversity device according to an embodiment of the invention.

FIG. 3B is a diagram of non-uniform power transmission gain patterns of two antennae (e.g., antenna 111 and 112 of FIG. 1) of a transmit diversity device (e.g., transmit diversity device 110 of FIG. 1) according to an embodiment of the invention. According to one embodiment, a first antenna (e.g., antenna 111 of FIG. 1) may have a first power transmission gain pattern and a second antenna (e.g., antenna 112 of FIG. 1) may have a second power transmission gain pattern. The first and second power transmission gain patterns may be different. Antennae 111 and 112 have at least partially opposite, complementary, non-overlapping, and/or asymmetric, gain patterns.

According to embodiments of the present invention, first and second antennae 111 and 112 may be arranged with respect to each other in transmit diversity device 110 such that at least one minimum power region of the first gain pattern overlaps at least one maximum power region of the second gain pattern in a reference plane.

The maximum power regions of the combined power transmission gain patterns of first and second antennae 111 and 112 may be the unity of the individual maximum power regions of each of the first and second antennae 111 and 112. Since maximum power regions of the first gain pattern extend to supplement the minimum power regions of the second gain pattern, signals may be received in these regions that were previously not detected.

By aligning regions of maximum gain for first antenna 111 with regions of minimum gain for second antenna 112, the combined gain patterns of the first and second antennae 111 and 112 may be increased more uniformly, e.g., compared to conventional arrangements in which maximum gains are aligned with maximum gains and minimum gains with minimum gains. It should be noted that there is some diversity gain even where the two antennae that are equal, i.e., that on the average (around the circle or over the sphere) the antennae require the same power to satisfy a base station, or in directions in which there is no gain difference between the antennae. It will be recalled that when an antenna is operating in a low gain direction it needs high power to obtain the required power as observed at the receiver or base station. Thus, even with splitting the signal equally to the two antennae, the voltage addition on the average provides a high gain in that direction because the power needed for both antennae as the baseline for that direction is averaged. This increases the diversity gain averaged over all directions, but may result in less gain for any single direction.

Thus, for a particular transmission power, regions of the combined gain patterns of first and second antennae 111 and 112 that meet the performance standard at feedback device 120 may span a larger surface area in a reference plane when maximum gains and minimum gains coincide. When such transmissions span a larger surface area in a reference plane, the average power needed for all directions may be minimized. That is, the average 1/R is minimized, where R is the real gain.

A variety of arrangements of antennae 111 and 112 in transmit diversity device 110 may be used.

Each of antennae 111 and 112 may have a pattern shape as well as an orientation in space to enable a minimum gain region of one antenna to overlap a maximum gain region of the other.

In some configurations (e.g., shown in FIG. 3B), the pattern shape of the power transmission gain patterns of first and second antennae 111 and 112 may be non-uniform, asymmetric, patterned, and/or otherwise irregularly shaped, in a reference plane.

In another embodiment of the present invention, the first and second power transmission gain patterns of antennae 111 and 112 may have a uniform or symmetric shape, but may be oriented or pointed in different directions to form at least partially non-overlapping gain patterns.

Once the shape of the power transmission gain patterns of first and second antennae 111 and 112 is determined, the orientation may be established.

In a configuration (e.g., shown in FIG. 3B), since the pattern shapes of the gain patterns of antennae 111 and 112 are irregular, it may be easy to orient the antennae for increased diversity gain according to embodiments of the invention such that there may be a combined gain power in which a minimum power region of the first gain pattern overlaps a maximum power region of the second gain pattern in a reference plane.

It is a goal of embodiments of the invention, not only to produce a combined gain power in which a minimum gain region overlaps a maximum gain region, but to maximize the surface area in a reference plane of regions in which minimum gains overlap maximum gains. Equivalently, it is a goal of embodiments of the invention, to reduce the power consumption required to transmit signals to meet a predetermined standard set by feedback device 120 receiving the signal. For example, a plurality of different relative orientations of antennae may be tested or evaluated and the orientation in which the combined gain of the antennae is maximized may be used to manufacture transmit diversity device 110.

Figure 4A:
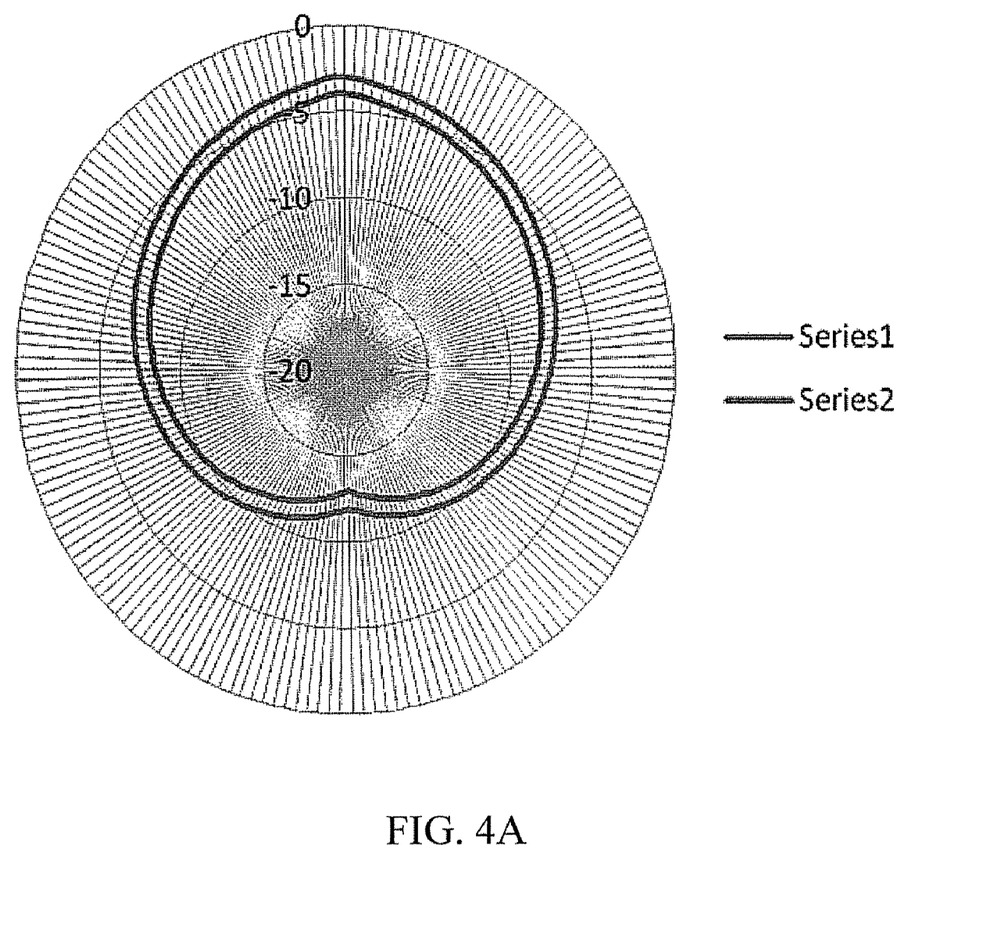
FIGS. 4A-4C are diagrams of power transmission gain patterns of two antennae of a transmit diversity device, each pattern having a different degree of overlap, according to an embodiment of the invention.
Figure 4B:
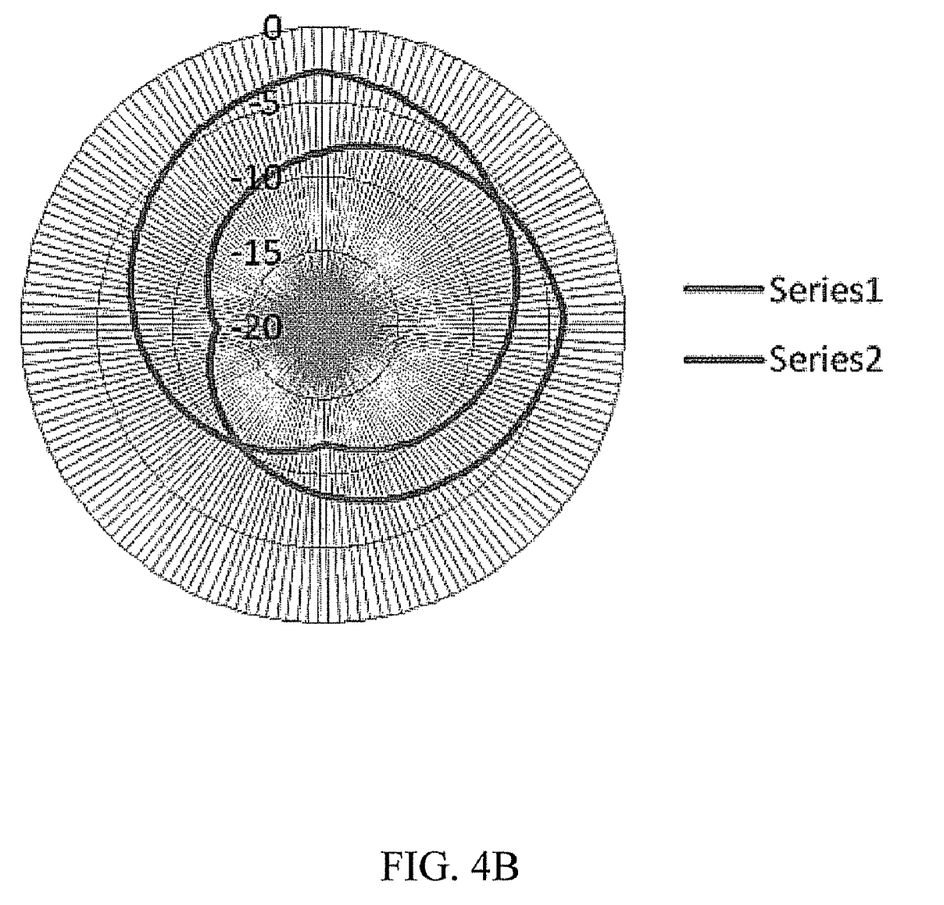
Figure 4C:
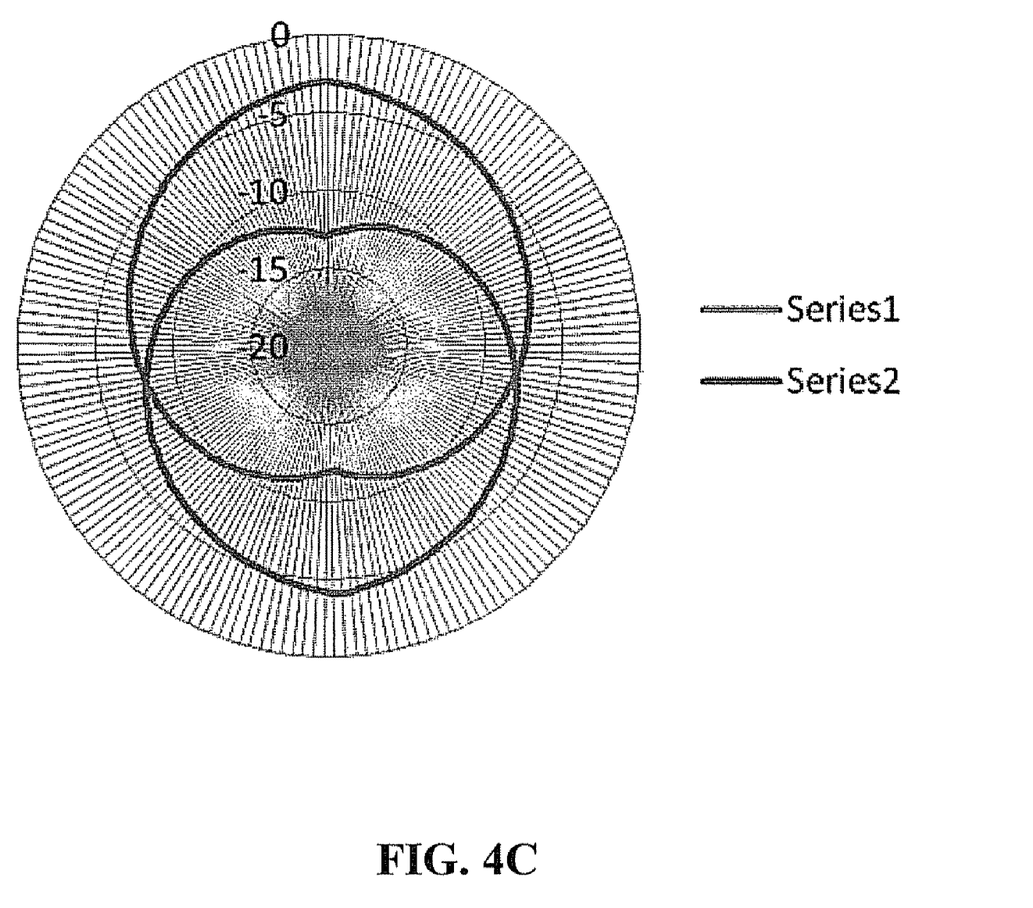

Reference is made to FIGS. 4A-4C, which are diagrams of power transmission gain patterns of two antennae (e.g., antenna 111 and 112 of FIG. 1) of a transmit diversity device (e.g., transmit diversity device 110 of FIG. 1). The graphs of FIGS. 4A-4C show power transmission gain patterns in different orientations with respect to each other. The graphs of FIGS. 4A-4C have an incremental (e.g., by 90° or π radians in the θ direction in polar coordinates in the reference plane of the graph) increase in the difference in the relative orientation of the gain patterns. It may be appreciated by persons skilled in the art that any incremental difference in relative orientation of gain patterns may be used (e.g., increasing the relative rotation by increments of approximately 1°, 5°, 10°, 50°, 180° in the θ direction).

The orientations of the directional antennae 111 and 112 may determine the orientations of their power transmission gain patterns. To incrementally increase the difference in the orientations of the power transmission gain pattern, the orientations of the first and second antennae 111 and 112 may be incrementally moved (e.g., translated or rotated) in transmit diversity device 110. For example, to generate the gain pattern of FIG. 4A first and second antennae 111 and 112 are aligned to point in the same direction. In one embodiment, to generate the gain pattern of FIG. 4B from the gain pattern in FIG. 4A, first antenna 111 forming the first gain pattern in FIG. 4A may be held in place, while second antenna 112 forming the second gain pattern in FIG. 4A is moved (e.g., rotated by 90° in the θ direction) with respect to first antenna 111. Alternatively, both first and second antennae 111 and 112 may be moved. To generate the gain pattern of FIG. 4C from the gain pattern in FIG. 4B, the antenna(e) 111 and/or 112 may be moved again by an incremental amount (e.g., rotated by 90° in the θ direction). Other methods may be used to produce alignment of maximum gains of one antenna with minimum gains of another antenna. For example, alternatively or additionally with the above, in some embodiments of the invention, reflectors or directors may be used to shape the gain patterns of the respective antennae, or the antenna structures may be excited to create different modes of operation.

FIG. 4A shows power transmission gain patterns of two antennae 111 and 112, where the gain patterns have the same shape and direction. The shapes of the power transmission gain patterns for antennae 111 and 112 are non-uniform and rotationally asymmetric. However, it may be appreciate by persons skilled in the art that other gain pattern shapes or symmetries (e.g., as in FIG. 3B) may be used.

The power transmission gain patterns overlap and coincide such that, e.g., regions of maximum gain for both of antennae 111 and 112 coincide and regions of minimum gain for both of antennae 111 and 112 also coincide. Receiving feedback devices 120 located outside the span of the maximum gain pattern regions of the antennae may experience only a minimum value increase in signal strength from using the two of antennae 111 and 112 compared with using one antenna.

FIG. 4B shows power transmission gain patterns of antennae 111 and 112 oriented in different directions, according to an embodiment of the invention. The gain patterns of antennae 111 and 112 do not coincide. Antennae 111 and 112 are oriented 90° away from each other compared to the orientation in FIG. 4A, e.g., in the θ direction in polar coordinates in the reference plane of the graph. According to an embodiment of the invention, a region of minimum power of a first gain pattern overlaps a region of maximum power of a second gain pattern in the reference plane of the graph.

The gain pattern of the combined system of antennae 111 and 112 of FIG. 4B is more uniform and has a greater range of coverage than the aligned gain patterns of FIG. 4A. For example, regions of maximum gain value extend to supplement the power of regions of minimum gain value. The span of maximum gain (e.g., in the reference plane of the graph in FIG. 4B) is thereby increased to cover a greater geographical range, as compared to the span of maximum gain of conventional systems (e.g., in the reference plane of the graph in FIG. 4A).

FIG. 4C shows power transmission gain patterns of antennae 111 and 112, the gain patterns having a greater difference in orientation with respect to each other than the gain patterns in FIG. 4B. The two gain patterns are oriented 180° away from each other compared to the co-directional gain patterns of FIG. 4A, e.g., measured in the θ direction in polar coordinates in the reference plane of the graph. Since, among FIGS. 4A-4C, the difference in the relative orientations of the gain patterns is the greatest in FIG. 4C, the directional regions in which minimum and maximum gain values overlap is also the greatest. When the directional regions in which minimum and maximum gain values overlap is maximized, the coverage range of antennae 111 and 112 is likewise maximized (e.g., or equivalently the power consumption required to transmit signals to meet a predetermined standard set by feedback device 120 receiving the signal or the diversity gain is minimized). Therefore, antennae 111 and 112 oriented to form the gain patterns depicted in FIG. 4C may have a greater range of transmission and/or require less power in the low gain directions of either antenna taken alone.

Embodiments of the invention include determining which orientation(s) of antennae 111 and 112 has the greatest combined gain power in all directions or similarly, which orientation(s) of antennae 111 and 112 provides the greatest reduction in total transmission power required to communicate with receiving feedback devices 120 located within a predetermined distance range (e.g., in substantially all directions).

According to an embodiment of the invention, a number of different orientations of antennae 111 and 112 (e.g., as in FIGS. 4A-4C) may be simulated in transmit diversity device 110. For each orientation of antennae 111 and 112 arranged in transmit diversity device 110, transmissions are transmitted from the antennae 111 and 112 to the receiving feedback devices 120.

In one embodiment of the present invention, antennae 111 and 112 are arranged in transmit diversity device 110 to form gain patterns having a first relative orientation with respect to each other (e.g., as in FIG. 4A). Antennae 111 and 112 simultaneously transmit a first set of at least two signals with non-uniform directional gains. The orientation(s) of antennae 111 and 112 are changed to form gain patterns having a second different relative orientation (e.g., as in FIG. 4B). One or more of antennae 111 and 112 may be translated or rotated with respect to the other(s). Antennae 111 and 112, arranged to form gain patterns having the second orientation, simultaneously transmit a second set of at least two signals with non-uniform directional gains. The orientation of antennae 111 and 112 may be changed once again to form gain patterns having a third different relative orientation (e.g., as in FIG. 4C) and signals may be simultaneously transmitted again. This process may repeat until a number of different orientations are used. For each instance of repeating the process, an angle of rotation or radius of translation between at least two of the gain patterns or antennae 111 and 112 may be incrementally increased (e.g., rotating by 90° at a time). This process of re-orienting may be stopped when the angle of rotation has been cumulatively increased, e.g., by approximately 180°, 270°, or preferably 360°, in the θ direction in a reference plane.

Each set of at least two signals transmitted with non uniform antenna patterns are received by receiving feedback devices 120 located in plurality of different directions relative to, and at a predetermined distance from, transmit diversity device 110. The strength of each set of transmitted signals is measured for each of a plurality of different directions to sample the signal power in each of the directions. A processor may average the signal power received at the receiving feedback devices 120 for each set of transmitted signals in all the directions. The processor may then determine which orientation(s) of gain patterns and/or corresponding antennae 111 and 112 produces the greatest total perceived power. The relative orientation of antennae 111 and 112 that produces the smallest total required transmission power, e.g., a total averaged across a plurality of directions, may be the orientation of antennae 111 and 112 to be used in transmit diversity device 110.

Referring to FIGS. 4A-4C, at a given distance, FIG. 4A shows gain patterns having a smallest strength of received signals averaged in all directions; FIG. 4B shows a greater average signal strength than in FIG. 4A; and FIG. 4C shows the greatest average signal strength of the figures. Since FIG. 4C has the greatest average received signal strength, transmit diversity device 110 may be manufactured to have the arrangement of antennae 111 and 112 used to generate the gain pattern shown in FIG. 4C.

Several different physical arrangements of transmitting devices (e.g., transmit diversity device 110 of FIG. 1) and receiving devices (e.g., feedback device 120 of FIG. 1) may be used in a testing phase to test which relative antennae (e.g., antennae 111 and 112 of FIG. 1) orientation(s) maximize the diversity gain in a plurality of different directions. To sample the signal power in each of the directions, receiving devices may be located in plurality of different directions relative to, and at a predetermined distance from, the transmitting device. In one embodiment, a single transmitting device may be surrounded by a plurality of receiving devices located along a circle path with all points at a predetermined distance from the transmitting device. In another embodiment, a single transmitting device and a single receiving device may be used. In this embodiment, the transmitting device may be rotated with respect to the receiving device while transmitting signals thereto to simulate transmissions at each of a plurality of directions.

Optionally, transmissions may be sampled at each of a plurality of different distance ranges. In this embodiment, for each different direction, receiving devices may also be located at each of a plurality of different distances from the transmitting device. In one embodiment, there may be a circular array of receiving devices arranged along a plurality of differently distanced rings concentric with the transmitting device. Each receiving device may receive signals at a unique direction relative to, and a unique distance from, the transmitting device. In another embodiment, a plurality of receiving devices may be located in a line, each receiving device at a different distance from the single transmitting device. In this embodiment, the transmitting device may be rotated with respect to the receiving device while transmitting signals thereto to simulate transmissions at each of the plurality of directions and for each of the plurality of different distances.

A processor may be located, e.g., in the transmitting device (e.g., modifying processor 114 FIG. 1), one or more receiving device(s) (e.g., feedback processor 123 of FIG. 1), a central processing unit (not shown) in communication therewith, or in a remote server (not shown) in communication therewith (e.g., via network 100 of FIG. 1). For each relative antennae orientation in the transmitting device, the processor may compute an average of the signal strength received at the receiving device(s) in all directions. The average may include a standard discrete average such as a sum divided by the sample size, a continuous distribution which may be interpolated from the discrete sample data, an integral of the continuous distribution, a two or three dimensional value such as a surface area or volume. The average need not be weighted, but may be weighted to observe the average in a specific direction. Once the received signal strength is averaged over all directions for each relative antennae orientation, the processor may determine which relative antennae orientation results in the smallest average transmitted power. The transmit diversity device may be manufactured to have the antennae orientation used to generate the greatest average received signal strength.

In the aforementioned description, in polar coordinates, transmissions are sampled in one dimension (e.g., where the radius, r, i.e., the distance of receiving devices from the transmitting device, is constant, and only the angle in the $\theta$ direction varies) and two dimensions (e.g., where the radius, r, varies, i.e., when receiving devices are all located at a plurality of distances from the transmitting device, and the angle in the $\theta$ direction varies). However, it may be appreciated by persons skilled in the art that, with minor alterations, the transmissions may be sampled in other dimensions. For example, in polar coordinates, r, may be held contact, while the $\theta$ and $\phi$ directions vary. In this example, an array of receiving devices may be arranged in a concentric spherical surface centered about the transmitting device. Alternatively, in this example, a single transmitting device may rotate in two-dimensions (e.g., in the $\theta$ and $\phi$ directions in polar coordinates) relative a receiving device. In another example, transmissions may be sampled in three dimensions (e.g., where all of r, $\theta$, and $\phi$, vary). In this example, an array of receiving devices may be arranged at lattice points in a sphere centered about the transmitting device. Alternatively, in this example, a single transmitting device may rotate in two-dimensions (e.g., in the $\theta$ and $\phi$ directions in polar coordinates) relative to a line of receiving devices spaced from the transmitting device at a plurality of increasing distances.

Although embodiments of the invention described using physical transmitting devices having multiple antennae and one or more receiving devices to test the power of signals transmitted therebetween, it may be appreciated by persons skilled in the art that instead, a computer simulation of such an arrangement may be constructed. The computer simulation may require information, e.g., the antennae properties of the transmitting device (e.g., gain pattern shape, antennae capacitance, etc.), the antennae properties and required performance standard(s) of the receiving device(s), and any other required system properties (e.g., wireless protocol). Once these are known, the computer simulation may simulate the transmission and reception of signals in all directions and/or distances for each of a plurality of different relative orientations between the antennae. The computer simulation may determine according to calculations described herein, which relative orientation of antennae reduces the average signal power required in all directions.

What is claimed is:

1. A transmit diversity device, comprising:
a first antenna having a first power transmission gain pattern, said first gain pattern being non-uniform in a reference plane;
a second antenna having a second power transmission gain pattern, said second gain pattern being non-uniform in said reference plane, wherein the first and second antennae are arranged in said device with respect to each other such that in at least one direction in the reference plane, the first gain pattern has a minimum power gain and the second gain pattern has a maximum power gain; and a processor to receive a feedback signal from a receiving device and to produce based thereon a transmit diversity parameter, and to send for concurrent transmission over said first and second antennas, first and second respective transmission signals differing in respect of said transmit diversity parameter.

2. The transmit diversity device of claim 1, wherein the first and second antennas are arranged in said device with respect to each other such that each antenna has a minimum power gain in a first direction substantially opposite to a second direction having a maximum power gain.

3. The transmit diversity device of claim 1, wherein the first and second transmission gain patterns are statistically rotationally symmetric with respect to each other.

4. The transmit diversity device of claim 1, wherein the antennae are substantially identical and are oriented in different directions relative to the device.

5. The transmit diversity device of claim 1, wherein the transmit diversity parameter is selected from the group consisting of: relative phase and relative amplitude.

6. The transmit diversity device of claim 1, wherein the feedback signal relates to a quality of a signal received at the receiver from the transmit diversity device.

7. The transmit diversity device of claim 1, wherein the first transmission gain pattern is statistically rotationally symmetric with respect to the second transmission gain pattern.

8. A method for transmitting a signal using a mobile device, the method comprising:

separately transmitting a first signal using a first antenna having a first transmission gain pattern and a second signal using a second antenna having a second transmission gain pattern, wherein the first and second antennae are arranged in said device with respect to each other such that in at least one direction in a reference plane, the first gain pattern has a minimum power gain and the second gain pattern has a maximum power gain;

receiving from a receiving device first and second feedback signals relating to quality indication of the first and second transmitted signals;

determining a transmit diversity parameter based on said first and second feedback signals;

simultaneously transmitting first and second diversity transmission signals over first and second antennas, said first and second diversity transmission signals differing in respect of said transmit diversity parameter.

9. The method of claim 8, wherein the first and second antennae are arranged in said device with respect to each other such that each antenna has a minimum power gain in a first direction substantially opposite to a second direction having a maximum power gain.

10. The method of claim 8, wherein the first and second transmission gain patterns are statistically rotationally symmetric with respect to each other.

11. The method of claim 8, wherein the antennae are substantially identical and are oriented in different directions relative to the device.

12. The method of claim 8, wherein the transmit diversity parameter is selected from the group consisting of: relative phase and relative amplitude.

* * * * *